July 14, 1936.  C. W. SINCLAIR  2,047,895

VEHICLE WHEEL

Filed Aug. 17, 1931

INVENTOR
Charles W. Sinclair.
BY Whittemore Hulbert
Whittemore & Belknap
ATTORNEY Patented July 14, 1936

2,047,895

UNITED STATES PATENT OFFICE 2,047,895

VEHICLE WHEEL

Charles W. Sinclair, Detroit, Mich., assignor, by mesne assignments, to The Kelsey-Hayes Wheel Company, Detroit, Mich., a corporation of Delaware Application August 17, 1931, Serial No. 557,714

2 Claims. (Cl. 301—9)

The invention relates to wheels and refers more particularly to wheels for use with motor vehicles. One of the objects of the invention is to provide an improved construction of mounting a wheel body upon an inner hub. Another object is to so make the construction that different wheel bodies, such as wood spoked, sheet metal spoked or wire spoked bodies, may be interchangeably mounted upon the inner hub. A further object is to so construct the wire spoked and sheet metal spoked wheel bodies that they have outer hubs which are substantially alike.

These and other objects of the invention will become apparent from the following description, taken in connection with the accompanying drawing, in which Figure 1 is a front elevation of a portion of a wheel showing another embodiment of my invention;

Figure 1:
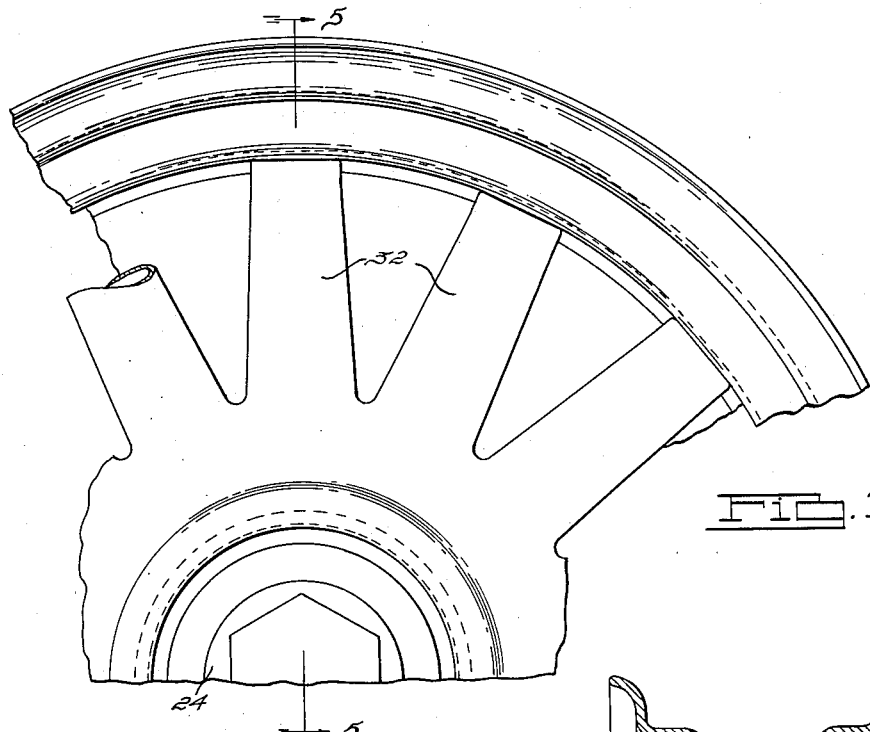
Figures 2, 3:
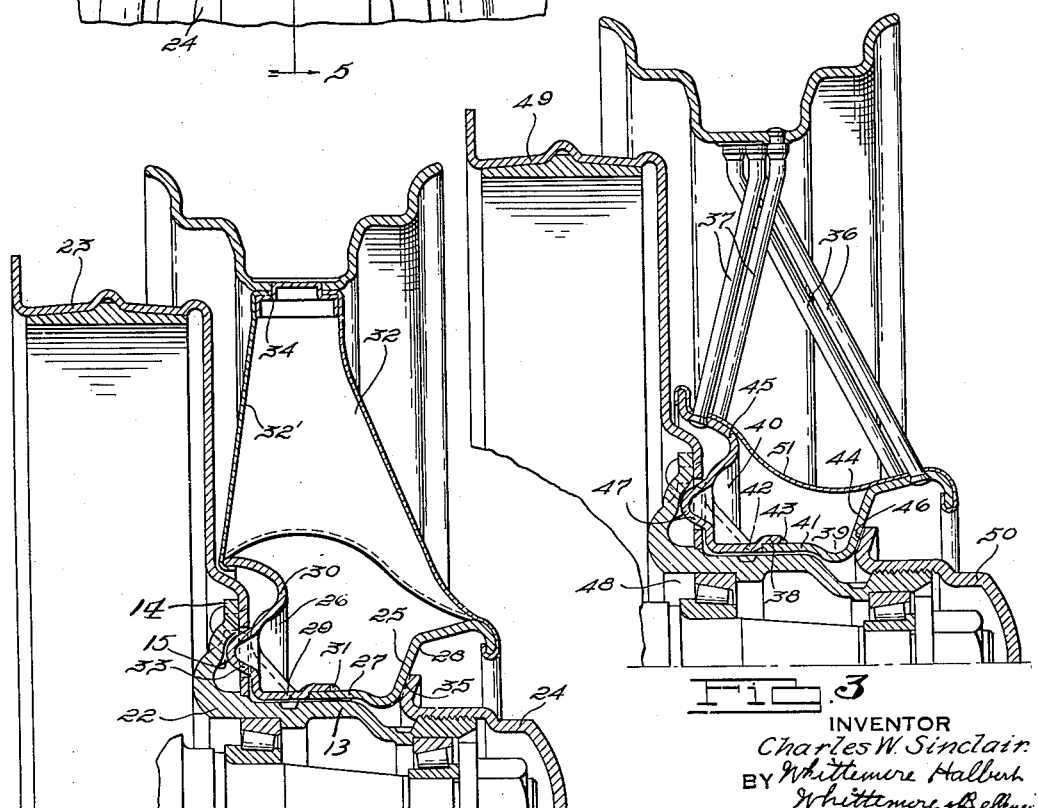
Figure 2 is a cross section on the line 2—2 of Figure 1.
Figure 3 is a view similar to Figure 2, showing another embodiment of my invention.

The embodiment of the invention featured in Figures 1 and 2 comprises a hollow sheet metal spoked wheel body which is adapted to be mounted upon the inner hub 22 having a barrel 13 over which the wheel body is sleeved and having a radially extending flange 14. This flange is provided intermediate its edges with the axially extending pockets or recesses 15 and the web of the brake drum 23 is apertured opposite the pockets. In detail, the wheel body has the outer hub member formed of the front and rear sections 25 and 26, respectively. The front section has the axially extending annular flange 27 and the radially extending flange 28. The rear section has the axially extending annular flange 29 and the radially extending flange 30. The axially extending flanges 27 and 29 telescope and are fixedly secured to each other by suitable means, such as the weld 31. The radially extending flanges 28 and 30, respectively, form front and rear enlarged portions of the outer hub member to which are secured the front and rear sections 32 and 32', respectively, of the sheet metal hollow spokes. These front and rear sections are fixedly secured together by suitable means, such as welding. The radially extending flange 30 of the rear section is provided with the rearwardly and axially extending projections or bosses 33, extending through the apertures in the web of the brake drum into the pockets 15 provided in the radially extending hub flange 14. The radially extending flange 28 of the front section is resilient and forms the outwardly and forwardly inclined annular face 35 for engagement with the securing nut 24 threadedly mounted on the barrel of the inner hub in the manner clearly shown in Figure 2.

In this construction, the rim member is secured to the spokes by the caps 34 which are located at the outer ends of the spokes and are fixedly secured to the rim member. In assembling, the front and rear sections are fixedly secured together, the caps are inserted outwardly within the spokes, the rim member is secured upon the spokes by means of the caps and then the outer hub member is secured within the spokes, the arrangement and method providing sufficient operating clearance and facilitating assembling of the caps within the spokes and securing the rim member to the spokes. The rim member is secured in place by extending the caps within the rim member and then by welding the caps and rim member together or by riveting over the caps. The rim member is preferably expanded by heating the same before being assembled upon the spokes and with the caps so that after the assembling operation this rim member has a firm engagement with the ends of the spokes.

In the modification shown in Figure 3, the wheel has the wire spoked wheel body with the front and rear spokes 36 and 37, respectively, and with the outer hub member 38 which is formed of the front and rear sections 39 and 40. The sections have the axially extending telescopically engaging annular flanges 41 and 42, respectively, which are fixedly secured to each other by the weld 43. The front section has the radially extending flange 44 and the rear section has the radially extending flange 45 and these two flanges respectively form the front and rear enlarged portions of the outer hub member to which are secured the inner ends of the front and rear spokes 36 and 37, respectively. The radially extending flange 44 is resilient and forms the outwardly and forwardly inclined annular face 46 corresponding to the face 35 and the radially extending flange 45 has formed therein the rearwardly and axially extending projections or bosses 47 corresponding to the projections or bosses 33. The inner hub member 48, the brake drum 49 and the securing nut 50 of this modification are exactly the same as the inner hub 22, the brake drum 23 and the securing nut 24.

For closing the reduced portion of the outer hub between its front and rear enlarged portions, I have provided the sheet metal annular closure member 51 extending between these front and rear enlarged portions and crimped over their ends, the closure member being apertured for the passage of the spokes.

From the above description, it will be readily seen that I have provided an improved construction of mounting a wheel body upon an inner hub and one in which the inner hub is adapted to interchangeably receive different types of wheel bodies. It will also be seen that I have so constructed sheet metal spoked and wire spoked bodies that they have substantially the same outer hubs.

What I claim as my invention is:

1. In a wheel, the combination with an inner hub member, of an outer hub member having front and rear sections encircling the inner hub member and each section formed with axially extending telescopically engaging tubular portions secured to each other, outwardly extending flanges integrally connected to the extremities of the tubular portions and having at the outer ends thereof axially extending flexible portions provided at the extremities with radially extending flanges, spokes having the inner ends secured to the flexible portions, and means for concealing the telescopically engaging tubular portions aforesaid of the outer hub member together with the connection therebetween comprising a closure member engaging the axially extending flexible portions and crimped over the radial flanges on the latter portions.

2. In a wheel, the combination with an inner hub, of an outer hub member encircling the inner hub and having spoke engaging portions at opposite ends of greater diameter than the intermediate portion of the outer hub member and terminating in radially extending flanges, and an enclosure for the outer hub seated upon the spoke engaging portions and having the opposite ends crimped around the marginal edges of said radially extending flanges.

CHARLES W. SINCLAIR.